United States Patent [19]

Fork et al.

[11] Patent Number: 4,727,553
[45] Date of Patent: Feb. 23, 1988

[54] SHORT PULSE LASER

[75] Inventors: Richard L. Fork, Middletown; James P. Gordon, Rumson; Janis A. Yaldmanis, Westfield, all of N.J.

[73] Assignee: American Telephone and Telegraph Company, AT&T Bell Laboratories, Murray Hill, N.J.

[21] Appl. No.: 792,054

[22] Filed: Oct. 28, 1985

[51] Int. Cl.[4] .................................................. H01S 3/13
[52] U.S. Cl. .......................................... 372/25; 372/30
[58] Field of Search ....................... 372/30, 25, 28, 31, 372/94; 350/350

[56] References Cited

PUBLICATIONS

*Applied Physics Letters,* 38, Fork et al., May 1, 1981, pp. 671–672, "Generation of Optical Pulses Shorter than 0.1 psec by Colliding Pulse Mode Locking".

*Optics Letters,* 9, Mollenauer et al., Jan. 1984, pp. 13–15, "The Soliton Laser".

*Optics Letters,* 9, May 1984, pp. 156–158, Theory of Passively Mode-Lock Laser Including Self-Phase Modulation and Group Velocity Dispersion".

*Primary Examiner*—Gene Wan
*Attorney, Agent, or Firm*—Richard D. Laumann; Gregory C. Ranieri

[57] ABSTRACT

A short pulse laser is described which has saturable absorption, saturable gain, group velocity dispersion, and self phase modulation means within a single optical cavity.

4 Claims, 4 Drawing Figures

SHORT PULSE LASER

TECHNICAL FIELD

This invention relates generally to the field of lasers and particularly to such lasers which produce short pulses.

BACKGROUND OF THE INVENTION

The production of extremely short pulses from lasers is of considerable interest and, accordingly, techniques have been devised which permit lasers to produce pulses of short temporal duration. These lasers may be, for example, dye, color center, gas, solid state or semiconductor lasers and promise to be useful in such commercial applications as time division multiplexing communications systems in which several bit streams of short duration pulses are interleaved. Of course, the pulse shape, as well as the pulse duration, are of interest.

The techniques that have been developed to produce short pulses fall into two general categories which will be discussed separately. First, there is modelocking. Exemplary of this technique is the article in *Applied Physics Letters*, 38, pp. 671–672, May 1, 1981 by Fork et al. Fork et al describe a passive modelocked laser which uses the interaction of two oppositely moving pulses in a thin saturable absorber to produce short pulses. The technique is more precisely referred to as colliding pulse modelocking. Pulses of a duration shorter than 65 fsec were obtained. The saturable absorber was 3-3'-diethyloxadicarbocyanine iodide (Rhodamine 6G) in a solvent of ethylene glycol. The saturable gain medium was a dye laser that was pumped with a cw argon laser. Two pulses move in opposite directions around the ring configuration, collide in the saturable absorber and couple energy between the pulses in such a way that the pulses have equal energies. The interaction of the two pulses produce a transient grating which, for example, acts to shorten the pulses. It should be noted that non-ring embodiments are also discussed. The two essential elements of the modelocking technique are the presence of saturable absorption and saturable gain.

Second, there is soliton type pulse shaping. Exemplary of this technique is the article in *Optics Letters*, 9, pp. 13–15, January 1984 by Mollenauer et al which describes what the authors term a soliton laser. According to one common definition a soliton is a pulse or a wave which moves without either dispersion, gain or loss of energy. A more generally accepted definition is that a soliton is a pulse whose shape periodically repeats during propagation. The soliton laser described optically couples two resonators. The first resonator generates a short pulse in a, e.g., color center modelocked laser. The output pulse from the color center laser resonator goes to a second resonator which has a single mode, polarization preserving optical fiber after which the pulse is then reinjected into the first resonator. The optical fiber has characteristics such that the group velocity dispersion and self phase modulation are of opposite signs. The group velocity dispersion is defined as the partial derivative of the group velocity with respect to wavelength. The self phase modulation is the result of a nonlinear refractive index with respect to light intensity. Thus, for example, frequencies in the leading half of the pulse are lowered while frequencies in the trailing half are raised.

This is better understood from the following considerations, if the group velocity dispersion is negative, i.e., anomalous, the leading or lower frequency portion of the pulse is retarded while the trailing or higher frequency portion of the pulse is hastened. The net result is that both pulse compression and shaping occur.

The observation of pulse narrowing and solitons in optical fibers was reported earlier in *Physical Review Letters*, 45, pp. 1095–1098, Sept. 20, 1980 by Mollenauer et al. It should be noted that the term soliton as it is commonly used also includes higher order solitons. Such solitons may actually contain what appear to be two or more pulses, the number depending upon the order, with the energy being periodically transferred between the pulses. However, any given pulse shape will be periodically repeated during propagation. The higher order solitons are generated as the peak pulse power is increased. Of course, there is also a minimum power level which must be exceeded for solitons to be generated. This technique requires anomalous dispersion to balance the self phase modulation. Mollenauer et al reported significant narrowing of a pulse from a color center laser.

It should also be pointed out that although the anomalous dispersion of a fiber was used to generate soliton shaping, other methods of obtaining negative dispersion are known to those skilled in the art. For example, the article in *Optics Letters*, 9, pp. 150–152, May 1984 by Fork et al describes using two pairs of prisms, i.e., four prisms to obtain negative dispersion. The prisms are identical and used at the minimum deviation angle and Brewster's angle incidence at each surface. The arrangement disclosed in advantageous because the negative group velocity dispersion is adjustable. The dispersion constant is determined by the second derivative of the optical path length with respect to the wavelength.

This prism configuration was used in a colliding pulse modelocked laser and pulse shortening was observed. The authors speculated that still shorter pulses might be obtained by adjusting the amounts of self phase modulation and negative dispersion.

Consideration of the above lasers shows that there are essentially four elements which are used to control the pulse duration: (1) saturable absorption; (2) saturable gain; (3) group velocity dispersion; and (4) self phase modulation. Typically, all four are always within a single laser and are therefore present and affect the laser operation to some degree. However, the lasers described are not optimized with respect to balancing all four effects as the first two effects are coupled with each other and the last two effects are also coupled with each other. For example, optimal saturable absorption and group velocity dispersion are not obtained simultaneously. Therefore, optimization has not occurred.

Theoretical studies have been done in which all four effects are simultaneously treated mathematically. For example, *Optics Letters*, 9, pp. 156–158, May 1984 describes one such study of passively mode locked lasers. While all effects are contained mathematically in the described study to some degree, there is no teaching of how to implement such a laser and there is no analysis of the effect of deep saturation of the absorber.

SUMMARY OF THE INVENTION

We have found that all four effects may be combined in a single laser resonator by using a saturable absorber which is deeply saturated by the pulses and by using the group velocity dispersion and self phase modulation to optimally compensate and shape the pulse. The laser has means for generating group velocity dispersion with a sign opposite to that produced by the means for generating the self phase modulation. There is enough saturable absorption to maintain, in one preferred embodiment, the soliton as the lowest order, that is, the n=1, soliton.

DETAILED DESCRIPTION

Figure 1:
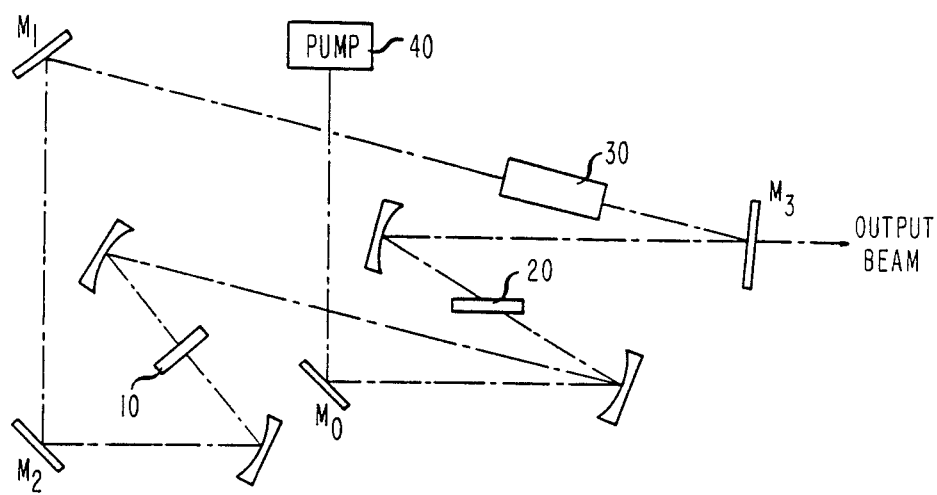
FIG. 1 is a schematic representation of a laser according to our invention.

A ring laser embodiment according to our invention is depicted in FIG. 1. It will be appreciated that other embodiments are contemplated. For reasons of clarity, the elements of the laser are not drawn to scale. The embodiment depicted comprises saturable absorber 10, saturable gain element 20, group velocity dispersion element 30, and pump 40. The ring configuration is obtained with mirrors $M_0$, $M_1$, $M_2$, and $M_3$. Light exits from the laser from mirror $M_3$. The light from pump is incident on mirror $M_0$.

Figure 2:
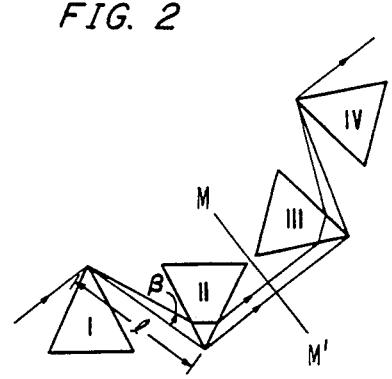
FIG. 2 depicts an exemplary negative dispersion element using two pairs of prisms.

The saturable absorber 10 comprised a dye, 3-3'-diethyloradicarbocyanine iodine in ethylene glycol and the gain element 20 comprised a dye, e.g., R6G, in ethylene glycol. The group velocity dispersion element comprised two pairs of prisms arranged as depicted in FIG. 2. The arrangement is symmetric about plane MM'. The optical path length is easily computed using the angle, $\beta$, and the distance, 1, between prism vertices. The entrance face of prism II is parallel to the exit face of prism I, etc., and the prisms are operated at minimum deviation and have an angle of incidence equal to Brewster's angle.

It will be appreciated that the elements 10, 20 and 30 described are illustrative only and other embodiments will be readily thought of by those skilled in the art.

It should be noted that the four-prism embodiment depicted provides adjustable, positive or negative, group velocity dispersion. This is desirable because it permits compensation of any group velocity dispersion which results from other components of the laser cavity. Such components include, for example, the mirror coatings, and for dye lasers, dyes as well as the dye solvent. Such control is desirable, if not essential, for optimizing the pulse shaping. The adjustment is obtained by moving one or more of the prisms along a line normal to its base. Other embodiments are, of course, contemplated.

The laser depicted has a superficial resemblance to that described by Fork et al but actually differs from that laser in several critical aspects. The laser mirrors have a reflectivity which favor oscillation at 635 nm as opposed to 620 nm and there is also a thicker, 30 microns, saturable absorber. The skilled artisan will be readily able to design mirrors having the desired reflection characteristics. The shift of the laser wavelength to the longer wavelength is critical for the embodiment depicted because it decreases the absorption due to the ground state of the absorber dye. Consequently, a point is reached where the pulse shaping caused by the absorber results almost entirely from the photoisomer of the dye. This is significant because, unlike the colliding pulse laser of Fork et al, the absorber can now be deeply saturated and the depth of the saturation can be varied in a continuous manner from extremely deep to moderate saturation. It should be noted that the use of a thicker absorbing medium, which in the embodiment depicted is a jet, reduces, although it does not eliminate, the colliding pulse character of the absorber saturation. Deep saturation is desirable because it, together with a rapid recovery of the bleached dye, permits control of both the leading and the trailing edge of the pulse.

Figure 3:
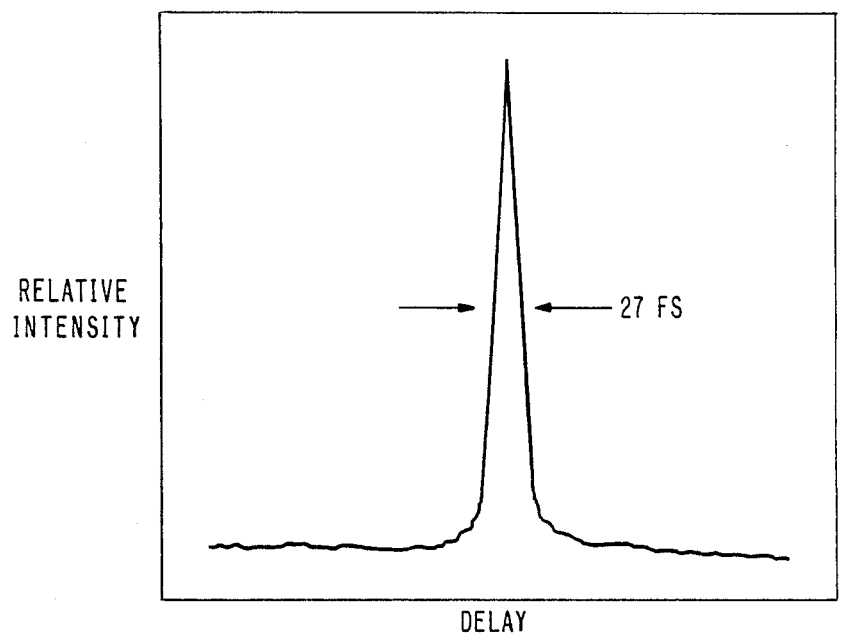
FIG. 3 plots a representative output pulse from our laser.

The output from the laser differs from that of the colliding pulse laser of Fork. FIG. 3 shows an auto correlation of the pulses with the delay horizontally versus the relative intensity of the output beam vertically. The observed pulse duration is 27 fsec assuming a $sech^2$ pulse shape. This is believed to be shorter than any observed pulse from any prior modelocked laser. The spectral bandwidth is approximately 150 Angstroms and closely approximates the transform limit. Short stable pulses can be generated for pump powers as low as 1.3 watts. However, the laser can also operate at pump levels as high as 40 percent over the threshold. It will be appreciated that this is unusual for conventional passive modelocked lasers. It should also be noted that the pulse width may be varied continuously up to a duration of approximately 500 fsec by adjusting the intracavity prism sequence to yield additional intracavity negative group velocity dispersion.

Figure 4:
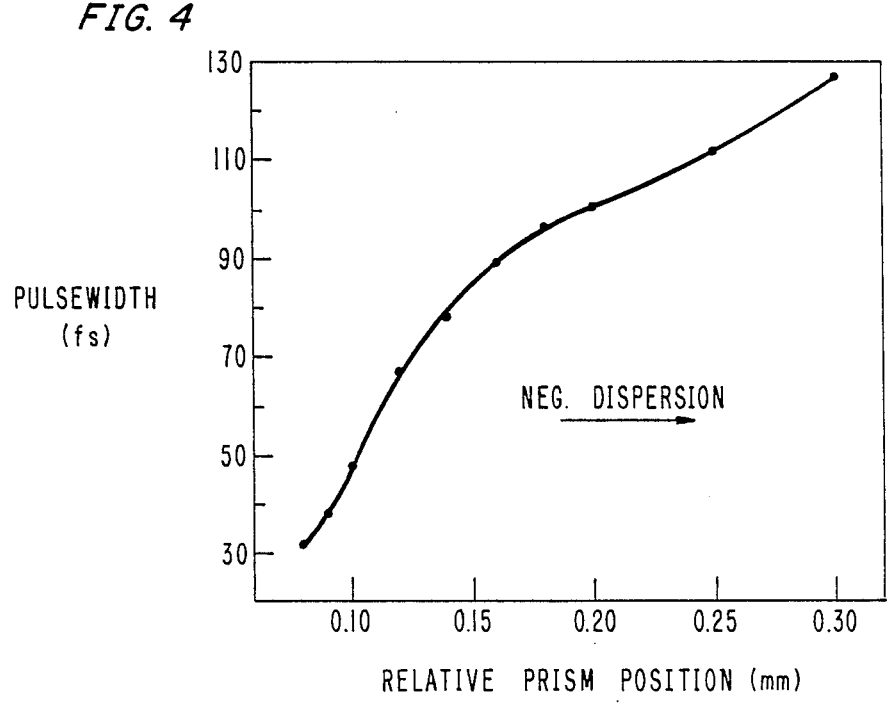
FIG. 4 plots the relative prism position horizontally versus the pulse width in fsec vertically.

This is depicted in FIG. 4 which plots the relative prism positions horizontally versus the pulse width vertically. Although the relative prism position is plotted, it is understood that it is directly related to the amount of the negative dispersion which increases from left to right. The asymmetric nature of the pulse width versus intracavity dispersion curve should be noted. That is, the curve is not symmetric about the point of minimum pulse width. The shape of this curve is discussed in the theoretical work by Martinez et al and it is believed that its experimental observation indicates soliton type pulse shaping. Soliton type shaping should be present because the soliton shaping mechanism compresses the pulse if the net intracavity group velocity dispersion and self phase modulation are of opposite signs. However, if both mechanisms have the same sign, the pulse will be distorted. Thus, for an arbitrary self phase modulation, the curve should be asymmetric about zero dispersion. In particular, the asymmetry becomes more pronounced as the soliton type shaping increases in importance relative to the conventional shaping. The occurrence of stable modelocking only for excess negative group velocity dispersion therefore indicates strong soliton type pulse shaping and a net intracavity self phase modulation which is positive and large. The soliton type pulse shaping occurs for only the fundamental soliton mode. The means for generating the group velocity dispersion and means for generating the self phase modulation are not only of opposite sign; they are also typically linear frequency chirps of similar magnitude.

For the shortest pulse, i.e., the optimum situation, the absorber is deeply saturated. In the embodiment particularly described, complicated self phase modulation typically results from a negative contribution from the absorber saturation and a positive contribution from the gain saturation is simplified. In particular, the absorber contribution is reduced so that the principal self phase modulation results from the positive self phase modulation caused by gain saturation together with a somewhat smaller contribution from the nonlinear refractive index of the dye solvent. This relatively simple positive self phase modulation can then be balanced by a negative group velocity dispersion introduced, as previously described, by the prism sequence, to yield soliton type shaping of the central portion of the pulse.

Still other embodiments will be thought of by those skilled in the art. For example, although a dye laser has been described, it will readily be appreciated by those skilled in the art that, for example, color center or semiconductor lasers may also be used. Additionally, although a ring configuration has been depicted, other configurations are also contemplated. Means, such as mirror coatings, can also be used to generate the group velocity dispersion.

What is claimed is:

1. A laser comprising means for defining a single optical resonator;
    a saturable gain medium;
    an absorbing element optically coupled to said gain medium; said absorbing element being capable of deep saturation;
    means optically coupled to said absorbing element for deeply saturating said absorbing element;
    means for generating group velocity dispersion to balance self phase modulation generated within said laser; said group velocity dispersion having a sign opposite to that of the self phase modulation; said saturable gain medium, said absorbing element and said group velocity dispersion generating means being positioned within said single optical resonator to facilitate optical coupling therebetween; said saturable gain medium and absorbing element restricting an optical pulse from said laser to have soliton type pulse shaping in the fundamental soliton mode.

2. A laser as recited in claim 1 in which said self phase modulation occurs predominantly in said gain medium.

3. A laser as recited in claim 1 in which said self phase modulation occurs predominantly in said saturable absorber element.

4. A laser as recited in claim 1 in which said means for generating group velocity dispersion comprises at least one prism causing an approximately linear chirp of said optical pulse.

* * * * *

UNITED STATES PATENT AND TRADEMARK OFFICE
CERTIFICATE OF CORRECTION

PATENT NO. : 4,727,553

DATED : February 23, 1988

INVENTOR(S) : Richard L. Fork, James P. Gordon and Janis A. Valdmanis

It is certified that error appears in the above-identified patent and that said Letters Patent is hereby corrected as shown below:

In the caption, (75) Inventors, "Janis A. Yaldmanis" should read

--Janis A. Valdmanis--

Signed and Sealed this

Sixth Day of September, 1988

*Attest:*

DONALD J. QUIGG

*Attesting Officer*   *Commissioner of Patents and Trademarks*